United States Patent
Li et al.

(10) Patent No.: US 11,820,656 B2
(45) Date of Patent: Nov. 21, 2023

(54) PREPARATION METHOD FOR WATER-SOLUBLE POTASSIUM POLYMETAPHOSPHATE

(71) Applicant: Yunnan Addiphos Technology Co., Ltd., Kunming (CN)

(72) Inventors: Jingmin Li, Kunming (CN); Wen Li, Kunming (CN)

(73) Assignee: YUNNAN ADDIPHOS TECHNOLOGY CO., LTD., Kunming (CN)

( * ) Notice: Subject to any disclaimer, the term of this patent is extended or adjusted under 35 U.S.C. 154(b) by 0 days.

(21) Appl. No.: 18/319,709

(22) Filed: May 18, 2023

(65) Prior Publication Data
US 2023/0286802 A1     Sep. 14, 2023

(30) Foreign Application Priority Data

Sep. 29, 2022   (CN) .......................... 202211198413.6

(51) Int. Cl.
*C01B 25/30* (2006.01)
(52) U.S. Cl.
CPC ................................. *C01B 25/306* (2013.01)
(58) Field of Classification Search
CPC .................................................. C01B 25/306
See application file for complete search history.

(56) References Cited

FOREIGN PATENT DOCUMENTS

CN     106348272 A    1/2017

OTHER PUBLICATIONS

CNIPA, Notification of First Office Action for Chinese application CN202211198413.6, dated Feb. 2023.
CNIPA, Notification to grant patent right for Chinese application CN202211198413.6, dated Apr. 14, 2023.

*Primary Examiner* — Khanh T Nguyen
(74) *Attorney, Agent, or Firm* — Zhigang Ma

(57) ABSTRACT

The present invention discloses a preparation method for water-soluble potassium polymetaphosphate, and relates to the technical field of potassium polymetaphosphate production and preparation. In the present invention, potassium dihydrogen phosphate is mixed with a divalent cationic metal oxide at a mixing mass ratio of 70-90:5-18 to obtained a mixture, wherein the divalent cationic metal oxide is one or more of calcia, magnesia and zinc oxide in the field of food processing; then the mixture is heated and melted, and the temperature is kept constant for 1-3 h at a temperature of 600-700° C.; and after temperature keeping, the melted mixture is cooled naturally to obtain a product. The water-soluble potassium polymetaphosphate prepared by the present invention has a high water solubility and effectively solves the application defect of a traditional potassium polymetaphosphate product which is insoluble in water.

4 Claims, No Drawings

PREPARATION METHOD FOR WATER-SOLUBLE POTASSIUM POLYMETAPHOSPHATE

TECHNICAL FIELD

The present invention belongs to the technical field of phosphate production and processing, and particularly relates to a preparation method for water-soluble potassium polymetaphosphate.

BACKGROUND

Potassium polymetaphosphate, also known as potassium metaphosphate and Kurrol's potassium salt, has a physical characteristic of being insoluble or rarely soluble in water. At present, potassium polymetaphosphate is widely used in the processing of chopped and mixed meat products as an emulsion stabilizer to retain moisture and improve texture, which can effectively improve the elasticity and tightness of chopped and mixed premade meat.

As potassium polymetaphosphate is insoluble in water, the application of potassium polymetaphosphate is somewhat restricted. For one example, when a phosphate solution containing potassium polymetaphosphate is injected into a meat product, a needle will be blocked, so that the potassium polymetaphosphate cannot be effectively injected to all parts of the meat product, and cannot be used in meat product rolling or injection process, thus the effect of the potassium polymetaphosphate in the rolling or injection process is influenced. For another example, food-grade potassium polymetaphosphate is a source of high phosphorus and potassium fertilizers, but cannot be used as a source of foliar spraying fertilizer because of the characteristic of being insoluble in water.

Based on this, by changing the conventional physical characteristic of potassium polymetaphosphate into a physical characteristic of being soluble in water, potassium polymetaphosphate will have a broader application range in the field of food processing or other industrial fields, such as meat product rolling or injection process, cosmetic, coating, water-soluble phosphorus and potassium fertilizers, and water treatment.

SUMMARY

In view of the defects of the prior art, the present invention provides a preparation method for water-soluble potassium polymetaphosphate. The method can change the physical characteristic of being insoluble in water of potassium polymetaphosphate, avoid the restriction of potassium polymetaphosphate in various application fields, and provide a broader application range in more industrial fields.

To make potassium polymetaphosphate soluble in water, and on the basis that a P—O—P bond is not spatially restricted by the formation of a small ring, some divalent cations are added to a raw material for preparing potassium polymetaphosphate to change a stable molecular structure arrangement of potassium polymetaphosphate into a circular molecular structure of potassium trimetaphosphate or potassium tetraphosphate, thus the characteristic of the polypotassium metaphosphate containing a circular molecular structure is change from being insoluble in water to being soluble in water.

The preparation method for water-soluble potassium polymetaphosphate of the present invention comprises the following steps:

(1) Mixing a production raw material of potassium polymetaphosphate, i.e., potassium dihydrogen phosphate, with a divalent cationic metal oxide at a mass ratio of 70-90:5-18, and mixing uniformly;

(2) Heating and melting the mixture of the potassium dihydrogen phosphate containing the divalent cationic metal oxide at a temperature of 600-700° C. to form a melted vitreous phosphate, and keeping the temperature constant for 1-3 h at this temperature to achieve complete polymerization;

(3) Cooling the melted mixture naturally and slowly after complete polymerization, wherein a rate for cooling the melted mixture slowly to room temperature is 2-6 h. The melted vitreous phosphate after cooling slowly has a water-soluble molecular structure of potassium polymetaphosphate;

The potassium dihydrogen phosphate in step (1) of the present invention can be a solid powder of potassium dihydrogen phosphate or an aqueous liquid of potassium dihydrogen phosphate formed by being neutralized with phosphoric acid and potassium hydroxide.

The metal oxide in step (1) of the present invention contains divalent cations. The divalent cations can be in one or more kinds; and the kinds of the divalent cations are dependent on application fields. For applications in food processing or water-soluble fertilizers, preferred divalent cations are metal oxides of Ca, Mg and Zn. Ca, Mg and Zn elements are nutritional ingredients in the application fields thereof.

The mass ratio of the potassium dihydrogen phosphate and the metal oxide in step (1) of the present invention is 70-90:5-18. A preferred mass ratio is dependent on dissolved quantity of potassium polymetaphosphate in water needed during application. For applications in food processing, a preferred mass ratio is 86:14, and the dissolved quantity of potassium polymetaphosphate in water is 8-10 g/100 mlH$_2$O.

The mixture in step (2) of the present invention is heated and melted at a temperature of 600-700° C. to form a melted vitreous phosphate, and the temperature is kept constant for 1-3 h at this temperature. A preferred heating temperature is 650° C., and a preferred constant temperature time is 2 h.

A preferred cooling rate for cooling naturally and slowly to room temperature in step (3) of the present invention is 4 h.

Compared with the prior art, the present invention has the following beneficial effects:

The present invention is to mix a positive divalent cationic metal oxide into potassium dihydrogen phosphate for heating and melting, and then produce water-soluble potassium polymetaphosphate after cooling slowly. The water-soluble potassium polymetaphosphate prepared by the present invention has a high water solubility and effectively changes the physical characteristic of traditional potassium polymetaphosphate which is insoluble in water, thus providing a broader application range for potassium polymetaphosphate.

In order to more clearly describe the process of the preparation method for water-soluble potassium polymetaphosphate, the present invention is described in details in the following embodiments.

DETAILED DESCRIPTION

To make the purpose, features and advantages of the present invention more clear and understandable, detailed description of the present invention will be explained below in details in combination with the embodiments. Several embodiments of the present invention are given in the detailed description. However, the present invention may be achieved in many different forms and will not be limited to the embodiments described herein. On the contrary, the purpose of providing the embodiments is to understand the disclosure in the present invention more thoroughly and comprehensively.

Embodiment 1

760 g of food-grade potassium dihydrogen phosphate and 140 g of calcia are uniformly mixed by a small V-type mixer to prepare a mixture;

The mixture is contained in a 1000 mL porcelain dish and placed in a muffle furnace for heating and melting, and the temperature is kept constant for two hours at 650° C.; then the mixture is taken out and sprinkled on an 80×20×2 cm stainless steel plate, and cooled naturally and slowly to obtain the water-soluble potassium polymetaphosphate.

As tested, the content of $P_2O_5$ in the water-soluble potassium polymetaphosphate prepared in the embodiment is 53.8 wt %, the content of $K_2O$ is 27.1 wt %, the content of Ca is 9.94 wt %, the dissolved quantity is 10 g/100 mL$H_2O$, and the pH of a saturated aqueous solution is 7.3.

Embodiment 2

740 g of food-grade potassium dihydrogen phosphate and 160 g of magnesia are uniformly mixed by a small V-type mixer to prepare a mixture;

The mixture is contained in a 1000 mL porcelain dish and placed in a muffle furnace for heating and melting, and the temperature is kept constant for two hours at 650° C.; then the mixture is taken out and sprinkled on an 80×20×2 cm stainless steel plate, and cooled naturally and slowly to obtain the water-soluble potassium polymetaphosphate.

As tested, the content of $P_2O_5$ in the water-soluble potassium polymetaphosphate prepared in the embodiment is 54.1 wt %, the content of $K_2O$ is 26.8 wt %, the content of Mg is 9.96 wt %, the dissolved quantity is 10.1 g/100mL$H_2O$, and the pH of a saturated aqueous solution is 7.5.

Embodiment 3

907 g of food-grade potassium dihydrogen phosphate, 43 g of calcia and 50 g of magnesia are uniformly mixed by a small V-type mixer to prepare a mixture;

The mixture is contained in a 1000 mL porcelain dish and placed in a muffle furnace for heating and melting, and the temperature is kept constant for two hours at 650° C.; then the mixture is taken out and sprinkled on an 80×20×2 cm stainless steel plate, and cooled naturally and slowly to obtain the water-soluble potassium polymetaphosphate.

As tested, the content of $P_2O_5$ in the water-soluble potassium polymetaphosphate prepared in the embodiment is 56.4 wt %, the content of $K_2O$ is 28.2 wt %, the content of Ca is 3 wt %, the content of Mg is 3 wt %, the dissolved quantity is 17.06 g/100mL$H_2O$, and the pH of a saturated aqueous solution is 7.15.

Embodiment 4

First, 776 g of phosphoric acid, 403 g of potassium hydroxide, 43 g of calcia and 50 g of magnesia are weighed. The potassium hydroxide, calcia and magnesia are uniformly mixed, placed in a 5000 mL beaker, added with water, and stirred to form a 55 wt % suspension. Then the phosphoric acid is added gradually under control, the phosphoric acid is added bit by bit while stirring, and stirring is continued after adding is finished until the suspension becomes clear.

The clear suspension is contained in a 1000 mL porcelain dish and placed in a muffle furnace for heating, dehydrating and melting, and the temperature is kept constant for two hours at 650° C.; then the obtained material is taken out and sprinkled on an 80×20×2 cm stainless steel plate, and cooled naturally and slowly to obtain the water-soluble potassium polymetaphosphate.

As tested, the content of $P_2O_5$ in the water-soluble potassium polymetaphosphate prepared in the embodiment is 56.1 wt %, the content of $K_2O$ is 28.05 wt %, the content of Ca is 3 wt %, the content of Mg is 3 wt %, the dissolved quantity is 16.5 g/100mL$H_2O$, and the pH of a saturated aqueous solution is 7.1.

The above embodiments only express several implementation modes of the present invention, and are described more specifically in details, but shall not be consequently interpreted as a limitation to the scope of the patent for the present invention. It should be noted that, for those ordinary skilled in the art, several deformations and improvements can also be made without departing from the concept of the present invention, all of which belong to the protection scope of the present invention. Therefore, the protection scope of the patent for the present invention shall be subject to appended claims.

The invention claimed is:

1. A preparation method for water-soluble potassium polymetaphosphate, comprising the following steps:
    (1) mixing potassium dihydrogen phosphate with a divalent cationic metal oxide, at a mixing mass ratio of 86:14;
    (2) heating and melting the mixture at a temperature of 600-700° C., and keeping the temperature constant for 1-3 h to achieve complete polymerization;
    (3) cooling the melted mixture naturally and slowly after complete polymerization, wherein a time for cooling the melted mixture slowly to room temperature is 2-5 h, and thus water-soluble potassium polymetaphosphate is obtained;
    wherein the divalent cationic metal oxide is one or more of calcia, magnesia and zinc oxide.

2. The preparation method according to claim 1, wherein a heating temperature in step (2) is 650° C. and a constant temperature time is 2 h.

3. The preparation method according to claim 1, wherein a time for cooling naturally and slowly in step (3) is 4 h.

4. The preparation method according to claim 1, wherein the water-soluble potassium polymetaphosphate can be used in the fields of meat product rolling or injection process, cosmetic, coating, water-soluble phosphorus and potassium fertilizers, and water treatment.

\* \* \* \* \*